United States Patent
Burghart

(10) Patent No.: US 8,906,997 B2
(45) Date of Patent: Dec. 9, 2014

(54) MULTIVINYL SILOXANE OLIGOMER-BASED POLYMER DISPERSIONS AND METHODS OF PREPARING AND USING THE SAME

(75) Inventor: Armin Burghart, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/813,731

(22) PCT Filed: Jul. 29, 2011

(86) PCT No.: PCT/EP2011/063110
§ 371 (c)(1),
(2), (4) Date: Apr. 15, 2013

(87) PCT Pub. No.: WO2012/016926
PCT Pub. Date: Feb. 9, 2012

(65) Prior Publication Data
US 2013/0197149 A1    Aug. 1, 2013

Related U.S. Application Data

(60) Provisional application No. 61/370,128, filed on Aug. 3, 2010.

(51) Int. Cl.
| | | |
|---|---|---|
| C08L 83/04 | (2006.01) |
| C08K 3/26 | (2006.01) |
| C08F 283/12 | (2006.01) |
| C09J 151/08 | (2006.01) |
| C09D 151/08 | (2006.01) |

(52) U.S. Cl.
CPC ............. *C08L 83/04* (2013.01); *C09J 151/085* (2013.01); *C09D 151/085* (2013.01); *C08F 283/12* (2013.01); *C08K 3/26* (2013.01)
USPC .......................................... 524/425; 524/547

(58) Field of Classification Search
CPC ......... C08L 83/04; C08K 3/26; C08F 283/12; C08F 212/08; C08F 220/00
USPC ................................. 524/425, 547
See application file for complete search history.

(56) References Cited

U.S. PATENT DOCUMENTS

| | | |
|---|---|---|
| 3,575,910 A | 4/1971 | Thomas |
| 3,729,438 A | 4/1973 | Plesich et al. |
| 4,333,867 A | 6/1982 | Sauntson |
| 4,716,194 A | 12/1987 | Walker et al. |
| 5,240,992 A | 8/1993 | Yamaya |
| 5,482,994 A | 1/1996 | Liles et al. |
| 5,763,012 A | 6/1998 | Zhao et al. |
| 5,932,651 A | 8/1999 | Liles et al. |
| 6,258,460 B1 | 7/2001 | Phan et al. |
| 6,528,590 B1 | 3/2003 | Beyer et al. |
| 6,541,566 B1 | 4/2003 | Farwaha et al. |
| 6,624,243 B2 | 9/2003 | Stark et al. |
| 6,767,642 B2 | 7/2004 | Paquet, Jr. et al. |
| 7,008,987 B2 | 3/2006 | Okada et al. |
| 7,125,922 B2 | 10/2006 | Barfurth et al. |
| 7,625,975 B2 | 12/2009 | Barfurth et al. |
| 7,723,426 B2 | 5/2010 | Cai et al. |
| 2003/0044611 A1 | 3/2003 | Stark et al. |
| 2003/0195316 A1* | 10/2003 | Stark .............................. 526/279 |
| 2007/0039679 A1 | 2/2007 | Urban et al. |
| 2008/0145676 A1 | 6/2008 | Minge et al. |
| 2009/0104238 A1* | 4/2009 | Stark et al. .................... 424/401 |
| 2011/0275513 A1 | 11/2011 | Tian et al. |

FOREIGN PATENT DOCUMENTS

| | | |
|---|---|---|
| DE | 4341260 | 5/1994 |
| DE | 4306831 | 9/1994 |
| DE | 4437879 | 5/1995 |
| DE | 19757494 | 7/1998 |
| EP | 0 352 339 A1 | 1/1990 |
| EP | 2 088 176 A1 | 8/2009 |
| EP | 2088176 A1 * | 8/2009 |
| WO | 96/35732 A1 | 11/1996 |

OTHER PUBLICATIONS

International Search Report mailed Jan. 23, 2012 in International Application No. PCT/EP2011/063110.
International Preliminary Report on Patentability mailed Feb. 5, 2013 in International Application No. PCT/EP2011/063110.

* cited by examiner

*Primary Examiner* — Michael M Bernshteyn
(74) *Attorney, Agent, or Firm* — Meunier Carlin & Curfman, LLC

(57) ABSTRACT

Multivinyl siloxane oligomer-based compositions and methods for their preparation and use are described herein. The multivinyl siloxane oligomer-based compositions can be prepared as aqueous polymer dispersion. The aqueous polymer dispersions can include water and a polymer derived from at least one multivinyl siloxane oligomer having an Si—O—Si backbone and at least one alkoxy group and one or more additional monomers. Further described herein are products including the aqueous polymer dispersions and methods for their preparation and use.

21 Claims, No Drawings

MULTIVINYL SILOXANE OLIGOMER-BASED POLYMER DISPERSIONS AND METHODS OF PREPARING AND USING THE SAME

BACKGROUND

Polymer dispersions can be used to prepare several consumer products. The mechanical properties of these products can be measured, for example, in terms of cohesive strength, flexibility, adhesion, and barrier properties. Several approaches have been used to increase these properties. For example, crosslinking agents have been added to the dispersions to increase the cohesive strength of the products. However, while crosslinking agents can lead to enhanced cohesive strength, these agents often diminish other mechanical properties (e.g., flexibility) of the products. Further, the use of these agents, particularly in large amounts, results in significant increases in product costs.

SUMMARY

Multivinyl siloxane oligomer-based polymer dispersions and methods for their preparation and use are described herein. The multivinyl siloxane oligomer-based polymer dispersions are aqueous polymer dispersions that can include water and a polymer derived from at least one multivinyl siloxane oligomer having an Si—O—Si backbone and at least one alkoxy group and one or more additional monomers. The polymer can be an acrylic-based polymer, a styrene-acrylic-based copolymer, or a styrene-butadiene-based copolymer. In some examples, the one or more additional monomers include monomers selected from the group consisting of acrylic acid, methacrylic acid, vinyl acetate, styrene, butyl acrylate, ethyl acrylate, ethylhexyl acrylate, acrylonitrile, and mixtures thereof.

In some examples, the at least one multivinyl siloxane oligomer includes more than one methoxy group and/or more than one ethoxy group. The polymer can be derived from 10% by weight or lower of the at least one multivinyl siloxane oligomer based on the dry weight of the polymer. For example, the polymer can be derived from 0.005% to 5% by weight or from 0.01% to 1% by weight of the at least one multivinyl siloxane oligomer based on the dry weight of the polymer. In some examples, the aqueous polymer dispersion can further include a surfactant.

Methods of producing the aqueous polymer dispersions are also described herein. The methods can include copolymerizing the at least one multivinyl siloxane oligomer having an Si—O—Si backbone and at least one alkoxy group and the one or more additional monomers to produce the aqueous polymer dispersion. In some examples, the copolymerization is performed using emulsion polymerization. In some examples, the polymer produced from the method comprises an acrylic-based polymer, a styrene-acrylic-based copolymer, or a styrene-butadiene-based copolymer.

Also described herein are products comprising the aqueous polymer dispersions. For example, the aqueous polymer dispersions can be used for several applications, including adhesives (e.g., flooring adhesives), coatings, films, paint, caulk, and sealants. In some examples, the products can include one or more additives, including, for example, plasticizers, coalescing agents, neutralizing agents, dispersants, stabilizers, pigments, fillers, and mixtures thereof. In some examples, the one or more additives comprise calcium carbonate. Methods of producing the products are also described herein. The methods include providing the aqueous polymer and drying the aqueous polymer dispersion.

The details of one or more embodiments are set forth in the description below. Other features, objects, and advantages will be apparent from the description and from the claims.

DETAILED DESCRIPTION

Multivinyl siloxane oligomer-based polymer dispersions and methods for their preparation and use are described herein. The multivinyl siloxane oligomer-based polymer dispersions can be prepared as aqueous polymer dispersions. The aqueous polymer dispersions can include water and a polymer derived from at least one multivinyl siloxane oligomer and one or more additional monomers. For example, the polymer can be derived from at least one multivinyl siloxane oligomer and one or more of an acrylate monomer, styrene, or butadiene to form an acrylic-based polymer, a styrene-acrylic-based copolymer, or a styrene-butadiene-based copolymer.

The multivinyl siloxane oligomer can include an Si—O—Si backbone. For example, the multivinyl siloxane oligomer can have a structure represented by Formula I:

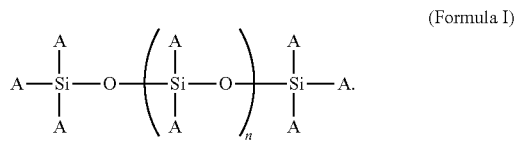

(Formula I)

In Formula I, each of the A groups are independently selected from hydrogen, hydroxy, alkoxy, substituted or unsubstituted $C_{1-4}$ alkyl, or substituted or unsubstituted $C_{2-4}$ alkenyl and n is an integer from 1 to 50 (e.g., 10).

As used herein, the terms "alkyl" and "alkenyl" include straight- and branched-chain monovalent substituents. Examples include methyl, ethyl, propyl, butyl, isobutyl, vinyl, allyl, and the like. The term "alkoxy" includes alkyl groups attached to the molecule through an oxygen atom. Examples include methoxy, ethoxy, and isopropoxy. The term "substituted" indicates the main substituent has attached to it one or more additional components, such as, for example, OH.

Each of the A groups in Formula I can be different groups or the same group. Also in Formula I, at least two of the groups attached to the Si—O—Si backbone are vinyl groups (e.g. one or more A groups can be vinyl groups). In some embodiments, at least one of the A groups in the repeating portion of Formula I are vinyl groups. The presence of multiple vinyl groups in the multivinyl siloxane oligomers enables the oligomer molecules to act as crosslinkers in the polymer dispersions. Additionally in Formula I, at least one of the groups attached to the Si—O—Si backbone is an alkoxy group. For example, one or more A groups can be methoxy groups, ethoxy groups, or combinations of these (i.e., the at least one multivinyl siloxane oligomer can include more than one methoxy group and/or ethoxy group). In some embodiments, one of the A groups in the repeating portion of group A is a vinyl group and the other A group is an alkoxy group. In some embodiments, all of the A groups are either vinyl or alkoxy groups.

In some examples, the multivinyl siloxane oligomer can have the following structure represented by Structure I-A:

(Structure I-A)

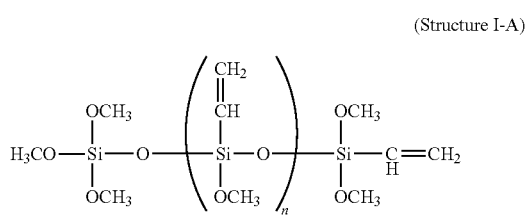

In Structure I-A, n is an integer from 1 to 50 (e.g., 10). Further examples of suitable multivinyl siloxane oligomers include DYNASYLAN 6490, a multivinyl siloxane oligomer derived from vinyltrimethoxysilane, and DYNASYLAN 6498, a multivinyl siloxane oligomer derived from vinyltriethoxysilane, both commercially available from Evonik Degussa GmbH (Essen, Germany). Other suitable multivinyl siloxane oligomers include VMM-010, a vinylmethoxysiloxane homopolymer, and VEE-005, a vinylethoxysiloxane homopolymer, both commercially available from Gelest, Inc. (Morrisville, Pa.).

In some examples, the multivinyl siloxane oligomers can be prepared by the partial condensation of monoethylenically unsaturated silane monomers (e.g., vinyltrimethoxysilane and vinyltriethoxysilane). The condensation can occur at the alkoxysilane groups on the monoethylenically unsaturated silane monomers, thus leaving the vinyl silane groups intact.

In some examples, the polymers included in the aqueous polymer dispersion are derived from 10% by weight or lower of the at least one multivinyl siloxane oligomer based on the dry weight of the polymer. For example, the polymer can be derived from 0.005% to 5% or from 0.01% to 1% by weight of the at least one multivinyl siloxane oligomer based on the dry weight of the polymer.

The polymers included in the dispersions described herein are derived from one or more additional monomers in addition to the multivinyl siloxane oligomers. The one or more additional monomers can include, for example, acrylic acid, methacrylic acid, vinyl acetate, styrene, butyl acrylate, ethyl acrylate, ethylhexyl acrylate, acrylonitrile, and mixtures thereof. Further examples of additional monomers include vinyltoluenes; conjugated dienes (e.g., 1,3-butadiene and isoprene); α,β-monoethylenically unsaturated mono- and dicarboxylic acids or anhydrides thereof (e.g., itaconic acid, crotonic acid, dimethacrylic acid, ethylacrylic acid, allylacetic acid, vinylacetic acid maleic acid, fumaric acid, mesaconic acid, methylenemalonic acid, citraconic acid, maleic anhydride, itaconic anhydride, and methylmalonic anhydride); esters of α,β-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C12, C1-C8, or C1-C4 alkanols such as ethyl methacrylate, n-butyl methacrylates, isobutyl acrylate, isobutyl methacrylate, and 2-ethylhexyl methacrylates, dimethyl maleate and n-butyl maleate); acrylamides and alkyl-substituted acrylamides (e.g., (meth)acrylamide, N-tert-butylacrylamide, and N-methyl(meth)acrylamide); diacetone acrylamide; (meth)acrylonitrile; vinyl and vinylidene halides (e.g., vinyl chloride and vinylidene chloride); vinyl esters of C1-C18 mono- or dicarboxylic acids (e.g., vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); silane monomers; and monomers containing glycidyl groups (e.g., glycidyl methacrylate). As used herein, the term "(meth)acrylate" includes both acrylates and methacrylates.

Additional monomers or co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl (meth)acrylates or alkylaminoalkyl(meth)acrylamides or quaternization products thereof (e.g., 2-(N,N-dimethylamino)ethyl (meth)acrylate, 3-(N,N-dimethylamino) propyl (meth)acrylate, 2-(N,N,N-trimethylammonium)ethyl (meth)acrylate chloride, 2-dimethylaminoethyl(meth)acrylamide, 3-dimethylaminopropyl(meth)acrylamide, and 3-trimethylammoniumpropyl(meth)acrylamide chloride); allyl esters of C1-C30 monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine).

The monomers used according to the invention may include cross-linking monomers, such as divinylbenzene; 1,4-butanediol diacrylate; methacrylic acid anhydride; monomers containing 1,3-diketo groups (e.g., acetoacetoxyethyl(meth)acrylate or diacetonacrylamide); and monomers containing urea groups (e.g., ureidoethyl (meth)acrylate, acrylamidoglycolic acid, and methacrylamidoglycolate methyl ether); and silane crosslinkers (e.g., 3-methacryloxypropyl trimethoxysilane and 3-mercaptopropyl trimethoxysilane). Additional examples of crosslinkers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking monomers include diesters or triesters of dihydric and trihydric alcohols with α,β-monoethylenically unsaturated monocarboxylic acids (e.g., di(meth)acrylates, tri(meth)acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. The crosslinking monomers when used in the copolymer can be present in an amount of from 0.2% to 5% by weight based on the weight of the total monomer.

Although not wishing to be bound by a particular theory, it is believed that the use of multivinyl siloxane oligomers as monomers in the polymers described herein can result in polymer structures containing siloxane clusters within the polymer backbone. It is believed that this differs from polymers derived from monoethylenically unsaturated silane monomers as these polymers are characterized by an essentially random distribution of the silane-functional groups throughout the polymer chain.

As described above, the polymer can be an acrylic-based polymer, a styrene-acrylic-based copolymer, or a styrene-butadiene-based copolymer. For example, the acrylic-based polymer can be derived from multivinyl siloxane oligomers, (meth)acrylate monomers, and optionally one or more additional monomers. For example, the acrylic-based polymer can be derived from greater than 50%, greater than 60%, greater than 70%, greater than 80%, or greater than 90% (meth)acrylate monomers and greater than 0 to 10% multivinyl siloxane oligomers. In some examples, styrene monomers are co-polymerized with the acrylate monomers and the multivinyl siloxane oligomers to form styrene-acrylic-based copolymers. For example, the styrene-acrylic-based copolymers can include from greater than 0% to less than 100% styrene, greater than 0% to less than 100% (meth)acrylates, greater than 0% to 10% multivinyl siloxane oligomers, and optionally one or more additional monomers (e.g., 10-60% styrene, 30-80% (meth)acrylates, 0-10% multivinyl siloxane oligomers, and 0-10% additional monomers). In other embodiments, the polymers can be styrene-butadiene-based copolymers derived from greater than 0% to less than 100% styrene, greater than 0% to less than 100% butadiene, greater than 0% to 10% multivinyl siloxane oligomers, and optionally one or more additional monomers (e.g., 10-80% styrene, 10-80% butadiene, 0-10% multivinyl siloxane oligomers, and 0-10% additional monomers).

The polymers described herein can be prepared by polymerizing the monomers using free-radical emulsion polymerization. The emulsion polymerization temperature is generally from 30° C. to 95° C. or from 75° C. to 90° C. The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient. Alternatively, other heterophase polymerization methods can be used, such as mini-emulsion polymerization. Further examples of polymerization methods include those described, for example, in Antonietti et al., *Macromol. Chem. Phys.*, 204:207-219 (2003), which is incorporated herein by reference.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium persulfate), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

One or more surfactants can be included to improve certain properties of the dispersion, including particle stability. For example, sodium laureth sulfate, sodium hexametaphosphate, tetrasodium pyrophosphate, tetrapotassium pyrophosphate, and alkylbenzene sulfonic acid or sulfonate surfactants could be used. Examples of commercially available surfactants include CALFOAM ES-303 (Pilot Chemical Company; Cincinnati, Ohio); DOWFAX 2A1, an alkyldiphenyloxide disulfonate surfactant available from Dow Chemical Company (Midland, Mich.); and ALCOSPERSE 149, a sodium polyacrylate surfactant available from Akzo Nobel Surface Chemistry (Chicago, Ill.). In general, the amount of surfactants employed can be from 0.01 to 5%, based on the total amount of the monomers to be polymerized.

Small amounts (e.g., from 0.01 to 2% by weight based on the total monomer weight) of molecular weight regulators, such as a mercaptan, can optionally be used. Such substances are preferably added to the polymerization zone in a mixture with the monomers to be polymerized and are considered part of the total amount of unsaturated monomers used in the copolymer.

In some examples, the polymers described herein have glass transition temperatures ($T_g$) from −10° C. to −50° C. as measured by differential scanning calorimetry. For example, the $T_g$ of the polymer can be between −20° C. and −40° C., −25° C. and −35° C., and −28° C. and −32° C. The aqueous polymer dispersions described herein can typically include a solids percentage of from 10 to 95% (e.g. from 50 to 70%).

In some examples, compositions including the aqueous polymer dispersions can further include one or more additives selected from the group consisting of pigments, tackifiers, wetting agents, defoamers, biocides, flame retardants, and mixtures thereof. The compositions including the polymer dispersions can further include fillers. Examples of fillers suitable for use in the aqueous dispersions described herein include calcium carbonate, ground/recycled glass (e.g., window or bottle glass), milled glass, glass spheres, glass flakes, clays (e.g., kaolin), feldspar, mica, talc, activated carbon, metals and alloys (e.g., nickel, copper, aluminum, silicon, solder, silver, and gold), metal-plated particulates (e.g., silver-plated copper, silver-placed nickel, and silver-plated glass microspheres), sol-gel ceramics (e.g., sol-gel $SiO_2$, $TiO_2$ or $Al_2O_3$), precipitated ceramics (such as $SiO_2$, $TiO_2$ or $Al_2O_3$), fused silica, fumed silica, amorphous fused silica, aluminum trihydrate (ATH), sand, ground sand, slate dust, crusher fines, red mud, amorphous carbon (e.g., carbon black), wollastonite, alumina, bentonite, quartz, garnet, saponite, beidellite, granite, calcium oxide, calcium hydroxide, antimony trioxide, barium sulfate, magnesium oxide, titanium dioxide, zinc carbonate, zinc oxide, nepheline syenite, perlite, diatomite, pyrophillite, soda ash, trona, inorganic fibers, and mixtures thereof.

Methods of preparing the polymer dispersions are also described herein. In some embodiments, the methods include copolymerizing at least one multivinyl siloxane oligomer and one or more additional monomers by emulsion polymerization. In other embodiments, the methods include co-polymerizing at least one multivinyl siloxane oligomer and one or more additional monomers to produce the aqueous polymer dispersion, the polymer comprising an acrylic-based polymer, a styrene-acrylic-based copolymer, or a styrene-butadiene-based copolymer.

The aqueous polymer dispersions described herein can be used in products, including, for example, adhesives, coatings, films, paint, caulk, or sealants. In some examples, the products include one or more additives. Examples of additives suitable for inclusion in the products include plasticizers, coalescing agents, neutralizing agents, dispersants, stabilizers, pigments, fillers (e.g., calcium carbonate), tackifiers, thickeners, defoamers, wetting agents, and mixtures thereof. In some embodiments, the product is a flooring adhesive used for bonding floor coverings.

The products can be produced by providing an aqueous polymer dispersion comprising water and a polymer derived from at least one multivinyl siloxane oligomer and one or more additional monomers, wherein the polymer comprises an acrylic-based polymer, a styrene-acrylic-based copolymer, or a styrene-butadiene-based copolymer, and drying the aqueous polymer dispersion.

The products prepared according to the methods described herein have improved mechanical properties as compared to products prepared without multivinyl siloxane oligomer-containing polymers (e.g., products prepared using monoethylenically unsaturated silanes as monomers in the polymerization process). For example, the products prepared according to the methods described herein display increased tensile strength as compared to polymer products prepared without multivinyl siloxane oligomers, even when small amounts of the multivinyl siloxane oligomers (e.g., 0.2%) are used.

The examples below are intended to further illustrate certain aspects of the methods and compositions described herein, and are not intended to limit the scope of the claims.

EXAMPLES

Example 1 and Comparative Examples 1-2

Preparation of Aqueous Polymer Dispersions

Example 1 was prepared by combining 205.3 g water, 0.07 g 40% aqueous solution of ethylenediamine tetraacetic acid (EDTA), and 0.7 g ascorbic acid into a reaction vessel and heating the mixture to 90° C. From an initiator feed of 114.4 g water and 8.6 g sodium persulfate, 10% was removed and added to the reaction mixture. Subsequently, the following three separate feeds were added with constant feed rate in this manner: (a) the remainder of the initiator feed was added within 3.75 hours; (b) 23.4 g of a monomer emulsion mixture feed consisting of 184.9 g water, 53.0 g 15% aqueous sodium lauryl sulfate, 5.9 g 90% aqueous LUTENSOL TDA-8, 53.0 g 10% aqueous sodium hydroxide, 0.8 g t-dodecylmercaptan, 2.7 g ethoxy substituted multivinyl siloxane oligomer (oligo-VTES), 91.4 g styrene, 22.5 g acrylic acid, and 1148.8 g n-butyl acrylate were added within 15 minutes, subsequently another 70.3 g within 15 min, and the remainder within 3.0 hours; and (c) after a time delay of 30 minutes, 59.6 g acrylonitrile were added within 2.5 hours. In the monomer emulsion feed, the amount of ethoxy substituted multivinyl siloxane oligomer present based on the total weight of the monomers is 0.2%. During the entire duration of the feeds, the temperature was held at 90° C. After the feed stage, the monomer emulsion tank was flushed with 15.9 g water, and the temperature was reduced to 85° C. The dispersion was post-stripped by adding the following two mixtures as two separate feeds over the course of 2 hours: (a) 6.5 g 70% tert-butyl hydroperoxide solution and 33.5 g water and (b) 4.5 g sodium metabisulfite, 2.6 g acetone, and 32.9 g water. The latex was then cooled, and optional post-additions were added (e.g., biocide) to form Example 1. Example 1 has a total solids content of 65.2% based on the weight of the aqueous dispersion, a pH of 4.4, a viscosity of 491 cps, and a $T_g$ of −31° C.

Comparative Example 1 was prepared as described in Example 1 except that the monomer emulsion mixture feed did not include the oligomeric ethoxy substituted multivinyl siloxane. Comparative Example 1 has a total solids content of 66.4% based on the weight of the aqueous dispersion, a pH of 5.6, and a viscosity of 588 cps.

Comparative Example 2 was prepared as described in Example 1 except that 0.2% oligomeric ethoxy substituted multivinyl siloxane was replaced with the 0.2% monovinyltriethoxysilane (VTES). Comparative Example 2 has a total solids content of 65.7% based on the weight of the aqueous dispersion, a pH of 4.6, and a viscosity of 136 cps.

Preparation of Films and Tensile Strength, Elongation, and Dynamic Mechanical Temperature Analysis Measurements:

Example 1, Comparative Example 1, and Comparative Example 2 were diluted to 40% total solids content with water and films were cast in teflon molds with a target dry thickness of 20 mils. The films were dried for 10 days in a controlled temperature and humidity environment (23° C. and 50% rel. humidity). The films were then cured at 50° C. for either 24 hours or 96 hours. The tensile and elongation properties of the films were measured by Instron (Instron Corp., Norwood, Mass.) with a crosshead speed setting of 7.9 in/min and a gap size of 1 inch. The film specimens were dogbone shaped with a width of 0.1575 inch. The dynamic mechanical temperature analysis (DMTA) measurements were performed at temperatures of 100° C. and 200° C.

The mechanical properties of the films cured at 24 hours and 96 hours at 50° C. are compared in Table 1. These results demonstrate that the tensile strength and complex modulus of films prepared from multivinylsiloxane oligomer-containing polymers is higher than films prepared from monovinylsilane-containing polymers or from polymers that exclude silanes.

TABLE 1

|  | Comp. Ex. 1 | Comp. Ex. 2 | Example 1 |
| --- | --- | --- | --- |
| Silane | None | 0.2% VTES | 0.2% oligo-VTES |
| Tensile (psi) [a] | 73 | 160 | 229 |
| Elongation (%) [a] | 1735 | 1746 | 1245 |
| G* at 100° C. [a] | 0.0436 | 0.0526 | 0.0499 |
| G* at 200° C. [a] | 0.0221 | 0.0243 | 0.0276 |
| Tensile (psi) [b] | 86 | 180 | 268 |
| Elongation (%) [b] | 1862 | 1805 | 1271 |
| G* at 100° C. [b] | 0.0456 | 0.0537 | 0.0528 |
| G* at 200° C. [b] | 0.0164 | 0.0241 | 0.0287 |

[a] Polymer films cured for 24 hours at 50° C.;
[b] Polymer films cured for 96 hours at 50° C.

Example 2 and Comparative Example 3

Example 2 was prepared as described in Example 1 except the amount of oligo-VTES used in the monomer emulsion mixture was increased to 0.3% based on the total weight of the monomers. Example 2 has a total solids content of 65.3% based on the weight of the aqueous dispersion, a pH of 4.7, a viscosity of 193 cps, and a $T_g$ of −30° C. Comparative Example 3 was prepared as described in Comparative Example 2 except the amount of VTES used in the monomer emulsion mixture was increased to 0.3% based on the total weight of the monomers. Comparative Example 3 has a total solids content of 65.5% based on the weight of the aqueous dispersion, a pH of 4.8, and a viscosity of 172 cps. The mechanical properties of the films cured at 24 hours and 96 hours at 50° C. are compared in Table 2. Similar to Example 1, these results demonstrate that the tensile strength and complex modulus of films prepared from multivinylsiloxane oligomer-containing polymers is higher than films prepared from monovinylsilane-containing polymers.

TABLE 2

|  | Comp. Ex. 3 | Example 2 |
| --- | --- | --- |
| Silane | 0.3% VTES | 0.3% oligo-VTES |
| Tensile (psi) [a] | 141 | 223 |
| Elongation (%) [a] | 1430 | 1210 |
| G* at 100° C. [a] | 0.0416 | 0.0636 |
| G* at 200° C. [a] | 0.0169 | 0.0311 |
| Tensile (psi) [b] | 162 | 231 |
| Elongation (%) [b] | 1506 | 1133 |
| G* at 100° C. [b] | 0.0472 | 0.0671 |
| G* at 200° C. [b] | 0.0177 | 0.0292 |

[a] Polymer films cured for 24 hours at 50° C.;
[b] Polymer films cured for 96 hours at 50° C.

Example 3 and Comparative Example 4

Example 3 was prepared as described in Example 2 except 0.3% oligomeric methoxy substituted multivinyl siloxane (i.e., oligo-VTMS) was used in the monomer emulsion mixture instead of 0.3% oligo-VTES. Example 3 has a total solids content of 65.2% based on the weight of the aqueous dispersion, a pH of 4.8, and a viscosity of 155 cps. Comparative Example 4 was prepared as described in Comparative Example 3 except 0.3% monovinyltrimethoxysilane (VTMS) was used in the monomer emulsion mixture instead of VTES. Comparative Example 4 has a total solids content of 66.6% based on the weight of the aqueous dispersion, a pH of 4.8, and a viscosity of 187 cps. The mechanical properties of the films cured at 24 hours and 96 hours at 50° C. are compared in Table 3. As shown in Examples 1 and 2, these results further demonstrate that the tensile strength and complex modulus of films prepared from multivinylsiloxane oligomer-containing polymers is higher than films prepared from monovinylsilane-containing polymers.

TABLE 3

|  | Comp. Ex. 4 | Example 3 |
| --- | --- | --- |
| Silane | 0.3% VTMS | 0.3% oligo-VTMS |
| Tensile (psi) [a] | 272 | 311 |
| Elongation (%) [a] | 1293 | 934 |
| G* at 100° C. [a] | 0.0597 | 0.0674 |
| G* at 200° C. [a] | 0.0285 | 0.0469 |
| Tensile (psi) [b] | 303 | 356 |
| Elongation (%) [b] | 1342 | 916 |
| G* at 100° C. [b] | 0.0637 | 0.0826 |
| G* at 200° C. [b] | 0.0275 | 0.0483 |

[a] Polymer films cured for 24 hours at 50° C.;
[b] Polymer films cured for 96 hours at 50° C.

Example 4 and Comparative Example 5

Example 4 was prepared as described in Example 2 except the amount of oligo-VTES used in the monomer emulsion mixture was increased to 0.6% based on the total weight of the monomers. Example 4 has a total solids content of 65.5% based on the weight of the aqueous dispersion, a pH of 4.5, and a viscosity of 108 cps. Comparative Example 5 was prepared as described in Comparative Example 3 except the amount of VTES used in the monomer emulsion mixture was increased to 0.6% based on the total weight of the monomers. Comparative Example 5 has a total solids content of 65.7% based on the weight of the aqueous dispersion, a pH of 4.7, a viscosity of 420 cps, and a $T_g$ of −29° C. Tensile strength and elongation data of the film prepared from Example 4 after curing for 96 hours at 50° C. were not determined. Further, the complex modulus data was not determined for Example 4 films. The mechanical properties of the Comparative Example 5 films cured for 24 hours and 96 hours at 50° C. and the tensile strength and elongation data for the Example 4 film cured for 24 hours at 50° C. are compared in Table 4. As also shown in the previous examples, these results demonstrate that the tensile strength and complex modulus of films prepared from multivinylsiloxane oligomer-containing polymers is higher than films prepared from monovinylsilane-containing polymers.

TABLE 4

|  | Comp. Ex. 5 | Example 4 |
| --- | --- | --- |
| Silane | 0.6% VTES | 0.6% oligo-VTES |
| Tensile (psi) [a] | 177 | 226 |
| Elongation (%) [a] | 1212 | 997 |
| G* at 100° C. [a] | 0.0347 | — |
| G* at 200° C. [a] | 0.0183 | — |
| Tensile (psi) [b] | 203 | — |
| Elongation (%) [b] | 1069 | — |
| G* at 100° C. [b] | 0.0360 | — |
| G* at 200° C. [b] | 0.0173 | — |

[a] Polymer films cured for 24 hours at 50° C.;
[b] Polymer films cured for 96 hours at 50° C.

Comparative Example 5 and Example 1

A film prepared from Comparative Example 5 (with 0.6% VTES) and a film prepared from Example 1 (with 0.2% oligo-VTES) were tested for use as pressure sensitive adhesives in terms of shear values on stainless steel. Example 1 had a shear value of greater than 17,000 min, whereas Comparative Example 5 had a shear value of only 7,000 min under the same experimental conditions. These results demonstrate that a small amount of multivinyl siloxane oligomer can be more effective than a larger amount of a monovinyl silane monomer.

In conclusion, it was shown that replacing monovinyl silane monomers such as VTES and VTMS with oligomeric ones having multiple vinyl groups on an equal or lower weight basis gives enhanced cohesive strength for the derived polymer films.

The dispersions, products, and methods of the appended claims are not limited in scope by the specific dispersions, products, and methods described herein, which are intended as illustrations of a few aspects of the claims and any dispersions, products, and methods that are functionally equivalent are intended to fall within the scope of the claims. Various modifications of the dispersions, products, and methods in addition to those shown and described herein are intended to fall within the scope of the appended claims. Further, while only certain representative dispersion materials and method steps disclosed herein are specifically described, other combinations of the dispersion materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

What is claimed is:

1. An aqueous polymer dispersion, comprising:
   water; and
   a polymer derived from
   (i) at least one siloxane oligomer having an Si—O—Si backbone, at least two vinyl groups, and at least one alkoxy group, and
   (ii) one or more additional monomers,
   wherein at least one of the vinyl groups is not provided as an end-group of the siloxane oligomer, and
   wherein the polymer comprises an acrylic-based polymer, a styrene-acrylic-based copolymer, or a styrene-butadiene-based copolymer.

2. The dispersion of claim 1, wherein the one or more additional monomers include monomers selected from the group consisting of acrylic acid, methacrylic acid, vinyl acetate, styrene, butyl acrylate, ethyl acrylate, ethylhexyl acrylate, acrylonitrile, and mixtures thereof.

3. The dispersion of claim 1, wherein the at least one siloxane oligomer includes more than one methoxy group.

4. The dispersion of claim 1, wherein the at least one siloxane oligomer includes more than one ethoxy group.

5. The dispersion of claim 1, wherein the polymer is derived from 10% by weight or lower of the at least one siloxane oligomer based on the dry weight of the polymer.

6. The dispersion of claim 1, wherein the polymer is derived from 0.005% to 5% by weight of the at least one siloxane oligomer based on the dry weight of the polymer.

7. The dispersion of claim 1, wherein the polymer is derived from 0.01% to 1% by weight of the at least one siloxane oligomer based on the dry weight of the polymer.

8. A product comprising the dispersion of claim 1, wherein the product comprises an adhesive, a coating, a film, a paint, a caulk, or a sealant.

9. A method of producing an aqueous polymer dispersion, comprising:
   copolymerizing (i) at least one siloxane oligomer having an Si—O—Si backbone, at least two vinyl groups, and at least one alkoxy group, and (ii) one or more additional monomers by emulsion polymerization,
   wherein at least one of the vinyl groups is not provided as an end-group of the siloxane oligomer.

10. A method of producing an aqueous polymer dispersion, comprising:
    copolymerizing (i) at least one siloxane oligomer having an Si—O—Si backbone, at least two vinyl groups, and at least one alkoxy group, and (ii) one or more additional monomers to produce the aqueous polymer dispersion,
    wherein at least one of the vinyl groups is not provided as an end-group of the siloxane oligomer, and
    wherein the polymer comprising an acrylic-based polymer, a styrene-acrylic-based copolymer, or a styrene-butadiene-based copolymer.

11. A product, comprising:
    a polymer derived from
    (i) at least one siloxane oligomer having an Si—O—Si backbone, at least two vinyl groups, and at least one alkoxy group, and
    (ii) one or more monomers,
    wherein at least one of the vinyl groups is not provided as an end-group of the siloxane oligomer,
    wherein the polymer comprises an acrylic-based polymer, a styrene-acrylic-based copolymer, or a styrene-butadiene-based copolymer; and
    wherein the product is an adhesive, a coating, a film, a paint, a caulk, or a sealant.

12. The product of claim 11, further comprising one or more additives selected from the group consisting of plasticizers, coalescing agents, neutralizing agents, dispersants, stabilizers, pigments, fillers, and mixtures thereof.

13. The product of claim 12, wherein the one or more additives comprise calcium carbonate.

14. The product of claim 11, wherein the one or more additional monomers are selected from the group consisting of acrylic acid, methacrylic acid, vinyl acetate, styrene, butyl acrylate, ethyl acrylate, ethylhexyl acrylate, acrylonitrile, and mixtures thereof.

15. The product of claim 11, wherein the at least one siloxane oligomer includes more than one methoxy group.

16. The product of claim 11, wherein the at least one siloxane oligomer includes more than one ethoxy group.

17. The product of claim 11, wherein the polymer is derived from 10% by weight or lower of the at least one siloxane oligomer based on the dry weight of the polymer.

18. The product of claim 11, wherein the polymer is derived from 0.005% to 5% by weight of the at least one siloxane oligomer based on the dry weight of the polymer.

19. The product of claim 11, wherein the polymer is derived from 0.01% to 1% by weight of the at least one siloxane oligomer based on the dry weight of the polymer.

20. The product of claim 11, wherein the adhesive comprises a flooring adhesive.

21. The dispersion of claim 1, wherein at least one of the vinyl groups is provided as part of a repeating unit of the siloxane oligomer.

\* \* \* \* \*